(12) United States Patent
Giacobbe

(10) Patent No.: US 7,524,359 B2
(45) Date of Patent: *Apr. 28, 2009

(54) METHODS FOR PURIFYING GASES HAVING ORGANIC IMPURITIES USING GRANULATED POROUS GLASS

(75) Inventor: Frederick W. Giacobbe, Naperville, IL (US)

(73) Assignee: American Air Liquide, Inc., Fremont, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/322,098

(22) Filed: Dec. 29, 2005

(65) Prior Publication Data

US 2007/0151450 A1 Jul. 5, 2007

(51) Int. Cl.
*B01D 53/04* (2006.01)

(52) U.S. Cl. .................. 95/143; 95/148; 95/900; 423/245.1

(58) Field of Classification Search .............. 95/90, 95/141, 143–145, 148, 900; 96/108, 121, 96/122, 126–128, 130, 134, 143, 144; 423/210, 423/245.1; 502/38, 407–413; 422/177; 252/184; 501/39, 54
See application file for complete search history.

(56) References Cited

U.S. PATENT DOCUMENTS

| | | | |
|---|---|---|---|
| 2,106,744 A | | 2/1938 | Hood et al. |
| 2,221,709 A | | 12/1940 | Hood et al. |
| 2,286,275 A | | 6/1942 | Hood et al. |
| 3,252,270 A | * | 5/1966 | Pall et al. .................. 95/143 |
| 3,485,687 A | | 12/1969 | Chapman et al. |
| 3,963,462 A | * | 6/1976 | Golovko et al. .............. 95/103 |
| 4,482,360 A | | 11/1984 | Taketomo et al. |
| 4,583,996 A | | 4/1986 | Sakata et al. |
| 4,689,150 A | | 8/1987 | Abe et al. |
| 4,842,620 A | | 6/1989 | Hammel et al. |
| 4,902,307 A | | 2/1990 | Gavalas et al. |
| 5,160,352 A | | 11/1992 | Najjar et al. |
| 5,310,414 A | | 5/1994 | Najjar et al. |
| 5,614,001 A | | 3/1997 | Kosaka et al. |
| 5,634,354 A | | 6/1997 | Howard et al. |
| 5,753,011 A | | 5/1998 | Sircar et al. |
| 5,945,079 A | | 8/1999 | Mullhaupt et al. |
| 5,958,091 A | | 9/1999 | Sakai et al. |
| 5,958,098 A | | 9/1999 | Heung |
| 5,989,319 A | | 11/1999 | Kawae et al. |
| 6,066,592 A | | 5/2000 | Kawae et al. |
| 6,074,457 A | | 6/2000 | Anthonis et al. |
| 6,090,289 A | | 7/2000 | Verduijn et al. |
| 6,171,556 B1 | * | 1/2001 | Burk et al. .................. 422/173 |
| 6,231,642 B1 | | 5/2001 | Shelby et al. |
| 6,350,297 B1 | | 2/2002 | Doyle et al. |
| 6,352,578 B1 | * | 3/2002 | Sakata et al. .................. 96/134 |
| 6,527,833 B1 | | 3/2003 | Oyama et al. |
| 6,547,859 B1 | | 4/2003 | Mallhaupt et al. |
| 2003/0000387 A1 | | 1/2003 | Uemura et al. |
| 2004/0127358 A1 | | 7/2004 | Derosa et al. |
| 2007/0107599 A1 | * | 5/2007 | Hoke et al. .................. 96/108 |

FOREIGN PATENT DOCUMENTS

| | | |
|---|---|---|
| DE | 41 19 380 | 1/1992 |
| EP | 0 763 500 | 3/1997 |
| JP | 58208102 A | 12/1983 |
| JP | 59021502 A | 2/1984 |
| SU | 1 683 806 | 10/1991 |

OTHER PUBLICATIONS

Porous and Reconstructed Glasses, Thomas H. Elmer, Corning, Inc., 1992.
Base VYCOR® 7913, Lighting & Materials, Corning, Inc., 2001.
VYCOR® Brand Porous Glass 7930, Lighting & Materials, Corning, Inc., 2001.
Thermodynamic Properties of Nitrogen Adsorbed on Porous Glass at Cryogenic Temperatures, F.W. Giacobbe, Journal of Colloid and Interface Science, vol. 143, May 1991.
Thermodynamic Properties of Argon Adsorbed on Porous Glass plus Preadsorbed Water, Frederic Giacobbe, et al., Journal of Colloid and Interface Science, vol. 38, No. 1, Jan. 1972.
Demystifying Silica Gel, Steven Weintraub, Object Specialty Group Postprints, vol. 9, 2002.
Methods for Reconditioning Silica Gel, Steven Weintraub, Object Specialty Group Postprints, vol. 9, 2002.
New Logic Research Case Study, Membrane Filtration of Colloidal Silica, no date given.

(Continued)

*Primary Examiner*—Frank M Lawrence
(74) *Attorney, Agent, or Firm*—Christopher J. Cronin

(57) ABSTRACT

Methods and apparatus for purifying gases having organic impurities, including the use of granulated porous glass. The method of the invention includes the following steps. An impure gas comprising a first gas and an organic compound is provided. A packed bed of granulated porous glass is provided. The impure gas is allowed to flow into the packed bed, thereby preferentially adsorbing at least some of the organic compound on the granulated porous glass to yield a purified gas having a concentration of the organic compound that is lower than that of the impure gas. The purified gas is allowed to flow out of the packed bed.

14 Claims, No Drawings

OTHER PUBLICATIONS

Yang, R.T., Gas Separation by Adsorption Processes, New York, Butterworths, 1987, pp. 18-19.
Greenheck, Product Application Guide, Silica Gel Desiccant, Greenheck Fan Corp., 2000.
Chromatography on Glass of Controlled Pore Size, Dr. Wolfgang Haller, National Bureau of Standards, vol. 206, 1965.
Solid Phase Biochemistry, Application of Controlled Pore Glass in Solid Phase Biochemistry, Dr. Wolfgang Haller, National Bureau of Standards, pp. 535-597, 1983.
CBM Review, Adsorption Advances, Michael Mitariten, World Coal, Sep. 2002.
Adsorption Isotherms, Dr. mark Osborne, Apr. 2004.
Mass and Heat Transfer Through Fixed and Fluidized Beds, Chemical Engineering Progress, vol. 58, No. 7, Jul. 1962.
Heat and Mass Transfer, Fluid Solid Systems, Bernard W. Gamson, Great Lakes Carbon Corporation, vol. 47, No. 1, Jan. 1951.
Chemical Process Principals, Part Three, Kinetics and Catalysis, J.E. Ahlberg, Chap. XXII, pp. 1084-1093, 1939.
Flow of Gases Through Spherical Packings, James de Acetis, et al., The Technical Institute, vol. 52, No. 12, Dec. 1960.
Adsorption Studies of Vapors in Carbon Packed Towers, H.C. Engel, et al., AIChE, pp. 947-965, Feb. 1942.
Theory of Chromatography, Part 10—Formulae for Diffusion into Spheres and Their Application to Chromatography, Atomic Energy Research, E. Glueckauf, vol. 51, 1955.
Fixed-Bed Drying of Air Using Molecular Sieves, James I. Nutter, et al., Department of Chemical Engineering, vol. 5, 1966.
The Adsorption Isotherms of Methane, Nitrogen, Hydrogen and Their Mixtures on Charcoal at 76° K, A.J. Kidnay, et al., NBS Institute for Materials Research, Cryogenics Division, pp. 397-408, 1968.
The Kenetics of Adsorption of Methane and Nitrogen from Hydrogen Gas, A.J. Kidnay, et al., NBS Institute for Basic Standards, pp. 41-48, 1969.
The Adsorption Wave, Irving M. Klotz, Department of Chemistry, vol. 39, No. 2, pp. 241-268, Apr. 1946.
Separation by Adsorption Methods, Advances in Chemical Engineering, Theodore Vermeulen, Department of Chemical Engineering, vol. 2, pp. 147-208, 1958.
Thermodynamic Properties of Nitrogen Adsorbed on Porous Glass at Cryogenic Temperatures, F.W. Giacobbe, Journal of Colloid and Interface Science, pp. 451-462, vol. 143, No. 2, May 1991.
Adsorption and Desorption of $CO_2$ On Solid Sorbents, Ranjani Siriwardane, et al., U.S. Department of Energy, no date given.
$CO_2$ Adsorption on Carbonaceous Surfaces: A Combined Experimental and Theoretical Study, Alejandro Montoya, Institute of Chemistry, pp. 30-39, 2003.
Characterization of Adsorbents by Energy Profile of Adsorbed Molecules, Alan L. Myers, et al., Department of Chemical Engineering, pp. 73-81, 2001.
Cryogenic Adsorption of Low-Concentration Hydrogen on Charcoal, 5A Molecular Sieve, UOP S-115, ZSM-5 and Wessalith Day, R. Scott Willms, Los Alamos National Laboratory, no date given.
Gas Separation by Pressure Swing Adsorption, J.R. Martin, et al., Union Carbide Corporation, pp. 1071-1086, no date given.
Cryogenic Air Separation: The Last Twenty Years, Advances of Cryogenic Engineering, M. Grenier, et al., vol. 31, pp. 1063-1070, 1985.
The Kinetics of Adsorption of Methane and Nitrogen form Hydrogen Gas, A.J. Kidnay, et al., Advances in Cryogenin Engineering, vol. 14, pp. 41-48, Aug. 1968.
The Purification of Hydrogen Gas By Physical Adsorption at 76° K, Arthur J. Kidnay, pp. 1-161, Apr. 1968.
International Search Report for PCT/IB2008/051443.

* cited by examiner

METHODS FOR PURIFYING GASES HAVING ORGANIC IMPURITIES USING GRANULATED POROUS GLASS

CROSS-REFERENCE TO RELATED APPLICATIONS

This application is related to pending non-provisional patent application Ser. No. 11/322,085 entitled, "Systems for Purifying Gases Having Organic Impurities Using Granulated Porous Glass", filed on Dec. 29, 2005 herewith and is incorporated by reference. This application is also related to pending non-provisional patent application Ser. Nos. 11/736,367 and 11/736,395, each filed Apr. 17, 2007.

BACKGROUND

In some applications involving the use of hydrogen, or gas mixtures containing hydrogen, contamination of the process gas (or gases) can occur due to the presence or generation of organic gases, organic vapors, organic mists, or particulate matter during the particular processing application. And, if the initial, relatively pure, process gas (or gas mixture) is used in large volumes, purification and re-use of this gas may be an economic necessity.

Although there is an extensive body of literature covering varying methods of purifying gases, many of these methods are often problematic in dealing with relatively high concentrations of organic contaminants in gas streams containing high concentrations of hydrogen. For example, membrane purifiers can easily and rapidly become so contaminated themselves by the removal of organic vapors and oil mists, that they quickly become ineffective. Even the use of pre-filtration (for example, standard types of cartridge filters or activated carbon beds) to protect membrane type purifiers is often not effective for very long when there are high levels of organic mists or high molecular weight oil contamination within the gas(es) so purified. These kinds of pre-filtration/adsorption schemes can sometimes lead to frequent maintenance or complete replacement of the active filtering means and can also sometimes lead to irreparable deterioration in membrane elements if the contamination eventually "breaks through" any of the pre-filtering devices. One proposed solution includes that disclosed by: Kidnay, A. J., Hiza, M. J., and Dickson, P. F., "The Kinetics of Adsorption of Methane and nitrogen from hydrogen Gas", and "Advances in Cryogenic Engineering", Vol. 14, K. D. Timmerhaus (Editor), plenum Press, NY 1969, pp. 41-48 (hereinafter, Kidnay, et al.).

Another frequently used method of purifying gases such as hydrogen or helium involves cryogenic trapping of impurities entrained within these gases. In this kind of process, contaminants are removed by condensation, or adsorption, or by "freezing out" as solids within a low temperature adsorption bed. Often, at least one adsorption bed employed in using this kind of technique involves the use of activated Carbon (or activated charcoal, zeolitic molecular sieves, activated alumina, silica gels, and the like, as well as combinations of these conventional adsorbents) in a low temperature adsorption process [Kidnay, et al.]. The main problem with this approach is that it is difficult to regenerate conventional packed bed adsorbents that become saturated or nearly saturated with high molecular weight organic impurities. Typically, high temperature steam must be used in these cases and then an involved process of moisture removal by inert gas purging, at high temperatures, must follow that kind of regeneration step.

Many adsorbents are used in the field of gas separation, one of which includes silica gel. Silica gel is a granular, highly porous form of silica ($SiO_2$). Generally speaking, it is formed by reaction of a sodium silicate solution with a mineral acid such as HCl or $H_2SO_4$, followed by polymerization of the produced hydrosol. Because of the —OH functional groups, silica gel is a relatively polar material. On the other hand, porous glass is a relatively less polar material in comparison to silica gel.

SUMMARY

An object of the present invention is to provide a method for purifying gases containing an organic impurity that obviates some of the problems that are associated with more conventional approaches.

Thus, the method of the invention includes the following steps. An impure gas comprising a first gas and an organic compound is provided. A packed bed of granulated porous glass is provided. The impure gas is allowed to flow into the packed bed, thereby preferentially adsorbing at least some of the organic compound on the granulated porous glass to yield a purified gas having a concentration of the organic compound that is lower than that of the impure gas. The purified gas is allowed to flow out of the packed bed.

DESCRIPTION OF PREFERRED EMBODIMENTS

Granulated porous glass has a relatively high adsorption affinity for organic materials in the gaseous state or vapor state and will remove substantially all impurities of this type at relatively low temperatures. Even liquefied organic mists or solid organic particulate material can be trapped by filtration (assisted by adsorption) within a packed bed of granulated porous glass.

This new method of hydrocarbon removal from gases involves the use of one or more packed beds (filled or partially filled) with granulated porous glass. This material may have several different trade names and may be produced by several different companies. It is understood that the physical properties of various brands of porous glass may vary somewhat from brand to brand. These kinds of property variations can typically be compensated for by adjusting the volume amounts of porous glass that may be used in any particular purification application.

One of ordinary skill in the art will understand that the patent literature is replete with teachings of packed beds and devices containing them.

Due to properties of porous glass, it has a relatively high specific surface area due to the presence of pores, voids, micro-cracks, and surface imperfections. Typical BET surface areas of granulated porous glass are about 150 to about 250 $m^2/g$, more particularly, either about 150 to about 200 $m^2/g$ or about 200 to about 250 $m^2/g$. Typical average pore radii include about 40 Angstroms to about 3000 Angstroms. More particularly, typical average pore radii include about 40 Angstroms to about 200 Angstroms, about 40 Angstroms to about 60 Angstroms, and about 75 Angstroms to about 3000 Angstroms. Typical non-limiting examples of porous glass compositions include: more than about 94% wt. of $SiO_2$, about 4% wt. to about 6% wt. of $B_2O_3$, and about 0.25% wt. to about 1% wt. of either $Na_2O$ or $K_2O$; more than about 94% wt. of $SiO_2$, less than 6% wt. of $B_2O_3$, and less than about 1% wt. of either $Na_2O$ or $K_2O$ with the total wt. %'s of each of the $SiO_2$, $B_2O_3$, and $Na_2O$ or $K_2O$ essentially equal about 100; and more than about 94% wt. of $SiO_2$, about 2% wt. to about 6% wt. of $B_2O_3$, and about 0.025% wt. to about 0.25% wt. of either $Na_2O$ or $K_2O$.

Porous glass may be produced from glass having two phases (one soluble in acid and one insoluble in acid). The soluble phase is leached out of the glass with an acid leaving the insoluble portion behind. U.S. Pat. Nos. 2,106,744, 2,221, 709, No. 2,286,275, and 3,485,687 contain lenthy descriptions of how to prepare porous glass, the contents of which are incorporated by reference. One type of porous glass called controlled porosity glass (CPG) may be obtained from Prime Synthesis, Inc. (2 New Road, Suite 126, Aston, Pa., 19014) under the product name of Native-00500-CPG or Native-01000-CPG. Porous glasses may also be obtained from Corning Inc. (One Riverfront Plaza, Corning, N.Y. 14831) under the product name of Vycor 7930.

The impure gas, which is to be purified, contains at least a first gas and an organic impurity. Some non-limiting examples of the first gas include carbon dioxide, oxygen, nitrogen, hydrogen, germane, silane, disilane, trisilane, ammonia, helium, neon, argon, and mixtures of two or more thereof. The method of the invention is especially applicable to impure gases containing at least 10% by volume hydrogen up to less than 100% by volume. Hydrogen may also be present at a relatively higher concentration range such as at least 50% by volume up to less than 100% by volume.

The organic impurities may be gaseous in form, vaporous in form, mist-like in form, or they may even be in particulate form. While it is believed that the method invention may be used purify gases having non-hydrocarbon impurities, it is especially useful for removing hydrocarbons. Such non-limiting examples of such hydrocarbons include $CH_4$, $C_2H_6$, $C_3H_8$, $C_4H_{10}$, and straight chain alkanes or cycloalkanes having 5-9 carbon atoms, or straight chain alkanes, cycloalkanes, or aromatic alkanes having about 10 to about 70 carbon atoms.

Practice of the invention involves flow of an impure gas including a first gas and an organic compound into a packed bed of granulated porous glass. Because of the relatively high adsorption affinity of porous glass for organic materials in the gaseous state or vapor state, the organic compound is preferentially adsorbed thereupon thereby reducing the concentration of the organic compound in the impure gas and purifying it. The thus-purified impure gas is allowed to flow out of the packed bed.

Two or more packed beds of porous glass can be used so that one or more packed beds can be "off-line" while undergoing a regeneration process while other packed beds can be "on-line" and actively participating in the purification process. One of ordinary skill in the art will understand that regeneration in this context involves removal of at least some of the organic compound adsorbed on the porous glass thereby increasing its ability to adsorb the organic compound and consequently its ability to purify the impure gas.

The packed bed(s) may be regenerated with a purge gas. Typical purge gases include carbon dioxide, oxygen, nitrogen, hydrogen, germane, silane, disilane, trisilane, ammonia, helium, neon, argon, and mixtures of two or more thereof.

In the case of germane, silane, disilane, trisilane, and ammonia, these gases would be used as a purge gas only when they would be compatible with the impure gas to be purified. As one example, ammonia purge gas is particularly appropriate when the impure gas contains ammonia. Another typical purge gas would be the purified impure gas itself. This could be the purified gas exiting another packed bed(s) or from a vessel containing the purified gas. The purge gas may be heated before or during regeneration of the packed bed. Relatively higher temperatures will enhance desorption.

Preferably, the packed bed is regenerated with an oxygen-containing gas. Typical oxygen-containing gases include air and inert gases slightly enriched with oxygen. By action of the oxygen-containing gas flowing into the packed bed, the organic compound may be oxidized and/or desorbed. In the case of hydrocarbons, oxidation would yield $CO_2$ and $H_2O$. Preferably, enough oxygen in the oxygen-containing gas is allowed to react with the organic compound in order to completely oxidize it. The speed of the oxidation process can be significantly influenced by the concentration of oxygen in the regeneration gas and the temperature conditions that are permitted to exist during the regeneration process. Typically, the temperature of the oxygen-containing gas is at least 100° C.

One advantage of the invention is that regeneration of the packed bed may be carried out at a temperature higher than that achievable, with activated carbon (or other ignitable materials), thereby allowing improved performance in hydrocarbon removal from the packed bed. For instance, temperatures in excess of 450° C. may be used to regenerate the packed bed without causing any significant degradation.

If necessary, the impure gas stream may be pressurized. The impure gas stream may also be cooled by exchanging heat with a purified gas stream (or by some other cooling means). It is useful to filter the impure gas before it enters the packed bed and/or filter the purified gas after it exits the packed bed. After purification, the purified gas by be stored for later use, immediately re-used as a purge gas, or be used at a point-of-use in a separate process requiring the purified gas.

EXAMPLES

A sample of Corning Vycor Porous Glass (No. 7930) was deliberately contaminated with a source of gaseous hydrocarbons in air and at ambient temperatures until its color changed from clear and grasslike to a yellow/amber color. This material was then heat treated at 450±5° C. in a flowing substantially pure gaseous nitrogen atmosphere for five days. Then, this sample of porous glass was exposed to a flowing gaseous mixture consisting of 20% oxygen/80% nitrogen, at about one atmosphere, and at regeneration temperatures of 450±5° C. for one additional day. These processing conditions eliminated all traces of the organic contamination.

A subsequent measurement of the BET surface area of this material produced a result of 218 $m^2$/g at 77.3° K, indicating no significant alteration in the originally specified surface area of this material. The length of the regeneration test noted above was deliberately extended in order to prove that the effective internal and external surface area of the porous glass would not be compromised by high temperatures or long heating times. In other words, the pore volume and surface area of the crushed or porous glass is not affected by high temperatures that might be used in a regeneration process. Much shorter and similarly effective regeneration times at temperatures at or above 450° C. are also possible.

The high temperature regeneration process indicated above might not be possible using other type of less inert adsorbent materials. For example, a packed bed containing activated carbon (or charcoal) is very likely to begin burning (internally) under the same temperature and oxygen partial pressure condition, thus completely destroying the packed bed as well as the containment vessel. Other types of adsorbents would be either damaged by these hostile conditions (e.g., silica gel) or their inherent surface areas are very small relative to porous glass (e.g., alumina). In this case, their containment vessels would have to be extremely large in order to allow the same adsorption/absorption capacity as a much smaller containment vessel containing activated porous glass.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of purifying an impure gas, comprising the steps of:
    providing an impure gas comprising a first gas and an organic compound;
    providing a packed bed of granulated porous glass;
    allowing the impure gas to flow into the packed bed, thereby preferentially adsorbing at least some of the organic compound on the granulated porous glass to yield a purified gas having a concentration of the organic compound that is lower than that of the impure gas;
    allowing the purified gas to flow out of the packed bed;
    discontinuing the flow of impure gas into the packed bed;
    allowing a flow of an oxygen-containing gas heated to a temperature of at least 100° C. to flow into the packed bed thereby oxidizing any organic compounds adsorbed thereupon; and
    allowing the oxidized organic compounds, and any oxygen remaining after the adsorbed organic compounds have been oxidized, to flow out of the packed bed, thereby regenerating the packed bed.

2. The method of claim 1, wherein said first gas is carbon dioxide.

3. The method of claim 1, wherein said first gas is oxygen.

4. The method of claim 1, wherein said first gas is nitrogen.

5. A method of purifying an impure gas, comprising the steps of:
    providing an impure gas comprising a first gas and an organic compound;
    providing a packed bed of granulated porous glass;
    allowing the impure gas to flow into the packed bed, thereby preferentially adsorbing at least some of the organic compound on the granulated porous glass to yield a purified gas having a concentration of the organic compound that is lower than that of the impure gas; and
    allowing the purified gas to flow out of the packed bed, wherein said first gas is hydrogen and said hydrogen is present in the impure gas at a concentration of at least 10% by volume.

6. The method of claim 5, wherein said hydrogen is present in the impure gas at a concentration of at least 50% by volume.

7. A method of purifying an impure gas, comprising the steps of:
    providing an impure gas comprising a first gas and an organic compound;
    providing a packed bed of granulated porous glass;
    allowing the impure gas to flow into the packed bed, thereby preferentially adsorbing at least some of the organic compound on the granulated porous glass to yield a purified gas having a concentration of the organic compound that is lower than that of the impure gas; and
    allowing the purified gas to flow out of the packed bed, wherein said first gas is one of germane, silane, disilane, and trisilane.

8. A method of purifying an impure gas, comprising the steps of:
    providing an impure gas comprising a first gas and an organic compound;
    providing a packed bed of granulated porous glass;
    allowing the impure gas to flow into the packed bed, thereby preferentially adsorbing at least some of the organic compound on the granulated porous glass to yield a purified gas having a concentration of the organic compound that is lower than that of the impure gas; and
    allowing the purified gas to flow out of the packed bed, wherein said first gas comprises ammonia.

9. The method of claim 1, wherein said first gas is one or more of helium, neon, and argon.

10. The method of claim 1, wherein said organic compound is a hydrocarbon containing 1-4 carbon atoms.

11. The method of claim 1, wherein said organic compound is a hydrocarbon containing 5-9 carbon atoms.

12. The method of claim 1, wherein said organic compound is a hydrocarbon containing 10-70 carbon atoms.

13. The method of claim 1, wherein said oxygen-containing gas is heated to a temperature of at least 450° C.

14. The method of claim 1, wherein said oxygen-containing gas is heated to a temperature higher than an ignition temperature of activated carbon in the presence of an oxygen partial pressure equal to that of the oxygen-containing gas.

* * * * *